(12) United States Patent
Amundsen et al.

(10) Patent No.: US 7,900,011 B2
(45) Date of Patent: Mar. 1, 2011

(54) APPARATUS, SYSTEM, AND METHOD FOR IMPROVING SYSTEM PERFORMANCE IN A LARGE MEMORY HEAP ENVIRONMENT

(75) Inventors: Lance C. Amundsen, Foster City, CA (US); Scott E. Highbarger, Longmont, CO (US); Bruce J. Ryba, Fountain, MN (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 11/780,423

(22) Filed: Jul. 19, 2007

(65) Prior Publication Data

US 2009/0024679 A1 Jan. 22, 2009

(51) Int. Cl.
*G06F 17/00* (2006.01)
(52) U.S. Cl. ............... 711/170; 711/E12.009; 707/819
(58) Field of Classification Search ................... None
See application file for complete search history.

(56) References Cited

U.S. PATENT DOCUMENTS

| | | | |
|---|---|---|---|
| 6,070,173 A | 5/2000 | Huber et al. | 707/206 |
| 6,493,730 B1 | 12/2002 | Lewis et al. | 707/206 |
| 6,681,239 B1* | 1/2004 | Munroe et al. | 718/104 |
| 6,959,430 B2 | 10/2005 | Sokolov et al. | 717/118 |
| 7,146,390 B2 | 12/2006 | Garthwaite | 707/206 |
| 2002/0099765 A1* | 7/2002 | Otis | 709/203 |
| 2004/0199556 A1* | 10/2004 | Garthwaite | 707/206 |
| 2006/0059474 A1* | 3/2006 | Bhansali et al. | 717/151 |
| 2006/0212657 A1* | 9/2006 | Tuel | 711/133 |
| 2008/0243969 A1* | 10/2008 | Wintergerst et al. | 707/206 |

OTHER PUBLICATIONS

Levanoni et al., "An On-the-Fly Reference-Counting Garbage Collector for Java," ACM Transactions on Programming Languages and Systems, vol. 28, No. 1 Jan. 2006 pp. 1-69.
Chen et al., "Exploiting Frequent Field Values in Java Objects for reducing Heap Memory Requirements," Pennsylvania State University.
Domani et al., "Implementing an On-the-Fly Garbage Collector for Java," IBM Corporation.
Abraham et al., "Object Connectivity and Full Abstraction for a Concurrent Calculus of Classes," Theoretical Aspects of Computing—ICTAC 2004. First International Colloquium. Revised Selected Papers (Lecture Notes in Computer Science vol. 3407), pp. 37-51, Published: Berlin, Germany, 2004.

* cited by examiner

*Primary Examiner* — Kaushikkumar Patel
(74) *Attorney, Agent, or Firm* — Kunzler Needham Massey & Thorpe (57) ABSTRACT

A memory management system is disclosed having a first memory heap module that assigns newly created objects to a first memory category and assigns persistent objects to a second memory category. The memory management system further assigns infrequently accessed persistent objects to a third memory category. A garbage collecting module collects garbage on objects in the first and second memory categories, but does not access objects in the third memory category. An operating system pages inactive objects assigned to the third memory category to a stable store. A user can debug the system, checking how many objects are assigned to the third memory category, and how many objects assigned to the third memory category are not accessed after initial allocation. Objects can be assigned to the third memory category based on selected criteria including time since access, likelihood of future object access, object size, and object priority.

30 Claims, 9 Drawing Sheets

APPARATUS, SYSTEM, AND METHOD FOR IMPROVING SYSTEM PERFORMANCE IN A LARGE MEMORY HEAP ENVIRONMENT

BACKGROUND OF THE INVENTION

1. Field of the Invention

This invention relates to memory management, and in particular relates to memory management in an operating system utilizing garbage collection to recover allocated memory.

2. Description of the Related Art

Many programming environments allow the user to specifically allocate memory to objects, and have the environment automatically recover that memory when the objects are no longer referenced. For example, in a Java virtual machine, the user creates an object that references memory allocated to the object in a memory heap. A garbage collector scans the heap and removes the allocated memory, making that memory available again, after the object is no longer needed by the user. However, if the object is not removed but never accessed again, the memory remains allocated during the application life span—resulting in a memory "leak."

Most Java implementations restrict applications to a fixed memory heap size—typically 2 GB in a 32-bit application running on a virtual machine (with a 4 GB theoretical limit)—placing pressure on developers to minimize usage of the heap. Some Java implementations may allow significantly larger memory heap sizes. However, presently available heap management techniques drive the system to require equivalent physical random access memory (RAM) to the heap size if sufficient performance is to be maintained. Therefore, if an extremely large heap is required, the hardware costs can be significant. Further, garbage collection cycles of large memory heaps can be slow even when appropriate RAM is available. Although Java is the most popular and well known garbage collecting memory management environment, other garbage-collecting languages (e.g. Lisp, C#, etc.) have similar limitations.

SUMMARY OF THE INVENTION

From the foregoing discussion, Applicant asserts that a need exists for an apparatus, system, and method that allows large memory heaps to be utilized in garbage collecting memory environments. Beneficially, such an apparatus, system, and method would allow large memory heaps without requiring large physical RAM availability, and with improved garbage collection performance on the large memory heap.

The present invention has been developed in response to the present state of the art, and in particular, in response to the problems and needs in the art that have not yet been fully solved by currently available heap management techniques. Accordingly, the present invention has been developed to provide an apparatus, system, and method for improving system performance in a large memory heap environment.

An apparatus is disclosed for managing memory objects. The apparatus includes modules configured to functionally execute the steps of managing the memory objects. The apparatus may operate on an operating system that includes a Java virtual machine. The operating system may utilize a single level store memory architecture.

The apparatus includes a first memory heap module that assigns a newly created object to a first memory category, and a second memory heap module that assigns a persistent object to a second memory category. The first memory category may designate objects that belong to a nursery area of a Java memory heap, and the second memory category may designate objects that belong to a tenured area of the Java memory heap. The apparatus further includes a third memory heap module that assigns infrequently accessed persistent objects from the second memory category to the third memory category. The apparatus includes a garbage collecting module that checks the first memory category at a first frequency, and that checks the second memory category at a second frequency. The garbage collecting module checks a memory category by checking whether at least one object assigned to the memory category still has a reference. The garbage collecting module may avoid checking the third memory category.

In one embodiment, the apparatus further includes a memory clearing module that notifies an operating system that an object assigned to the third memory category is to be paged to a stable store. In one embodiment, the third memory heap module increments a counter each time a candidate object is not accessed during a pre-determined execution cycle, such as execution of the garbage collector, and assigns the candidate object to the third memory category from the second memory category in response to the counter exceeding an infrequently accessed threshold. The counter may be incremented by a first increment value if the candidate object is not large, and incremented by a second increment value if the candidate object is large. The infrequently accessed threshold may be set to a first threshold value if the candidate object is not large, and may be set to a second threshold value if the candidate object is large. In one embodiment, the apparatus further includes an object recovery module that assigns an object from the third memory category to the second memory category in response to an access event directed to the object.

In one embodiment, the apparatus further includes a user application module that operates a user application. The apparatus may further include an access prediction module that interprets a user interaction with the user application, estimates a contextual proximity for a candidate object based on the user interaction, and assigns the candidate object to the third memory category from the second memory category based on the contextual proximity for the candidate object.

The apparatus may include a third memory heap comprising memory space allocated to objects assigned to the third memory category, a user interface module that interprets a user request, and a display module that reports a size of the third memory heap and/or a list of objects assigned to the third memory category. In one embodiment, the display module reports a list of objects that are assigned to the third memory category, and that have never been accessed after initial allocation.

A system is disclosed for managing memory objects. The system includes an operating system (OS) comprising a Java virtual machine running on a computer system. The system further includes a memory management system. The memory management system includes a plurality of modules configured to functionally execute managing memory objects. The memory management system includes a first memory heap module, a second memory heap module, and a third memory heap module, and a garbage collecting module. In various embodiments, the system includes a memory clearing module, a user interface module, a display module, a user application module, and/or an access prediction module.

A method is disclosed for managing memory objects. The method may be implemented as a computer program product comprising a computer readable medium having a computer readable program, wherein the computer readable program causes a computer to execute the method. The method includes executing an OS utilizing garbage collection memory management. The method further includes assigning newly created objects to a first memory category, and assigning persistent objects to a second memory category. The method further includes assigning infrequently accessed persistent objects from the second memory category to a third memory category, and operating a garbage collector to check the first memory category at a first frequency, to check the second memory category at a second frequency, and to not check the third memory category.

In one embodiment, the method further includes assigning infrequently accessed persistent objects to the third memory category by incrementing a counter each time a candidate object is not accessed during an execution cycle, and assigning the candidate object from the second memory category to the third memory category when the counter exceeds and infrequently accessed threshold. In one embodiment, the method includes incrementing the counter by a first increment if the candidate object is not large, and incrementing the counter by a second increment if the candidate object is large. In one embodiment, the method includes incrementing the counter by a first increment if the candidate object is high priority, and incrementing the counter by a second increment if the candidate object is not high priority. In one embodiment, the method includes setting the infrequently accessed threshold to a first threshold value if the candidate objects is not large, and setting the infrequently accessed threshold to a second threshold value if the candidate objects is large. In one embodiment, the method includes setting the infrequently accessed threshold to a first threshold value if the candidate objects is high priority, and setting the infrequently accessed threshold to a second threshold value if the candidate objects is not high priority.

The method may include assigning an object from the third memory category to the second memory category in response to an access event directed to the object. The method may include periodically checking whether any objects assigned to the third memory category are garbage, or no longer referenced.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Any modules implemented as software for execution are implemented as a computer readable program stored on a computer readable storage medium and are thereby embodied in a non-transitory tangible medium.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
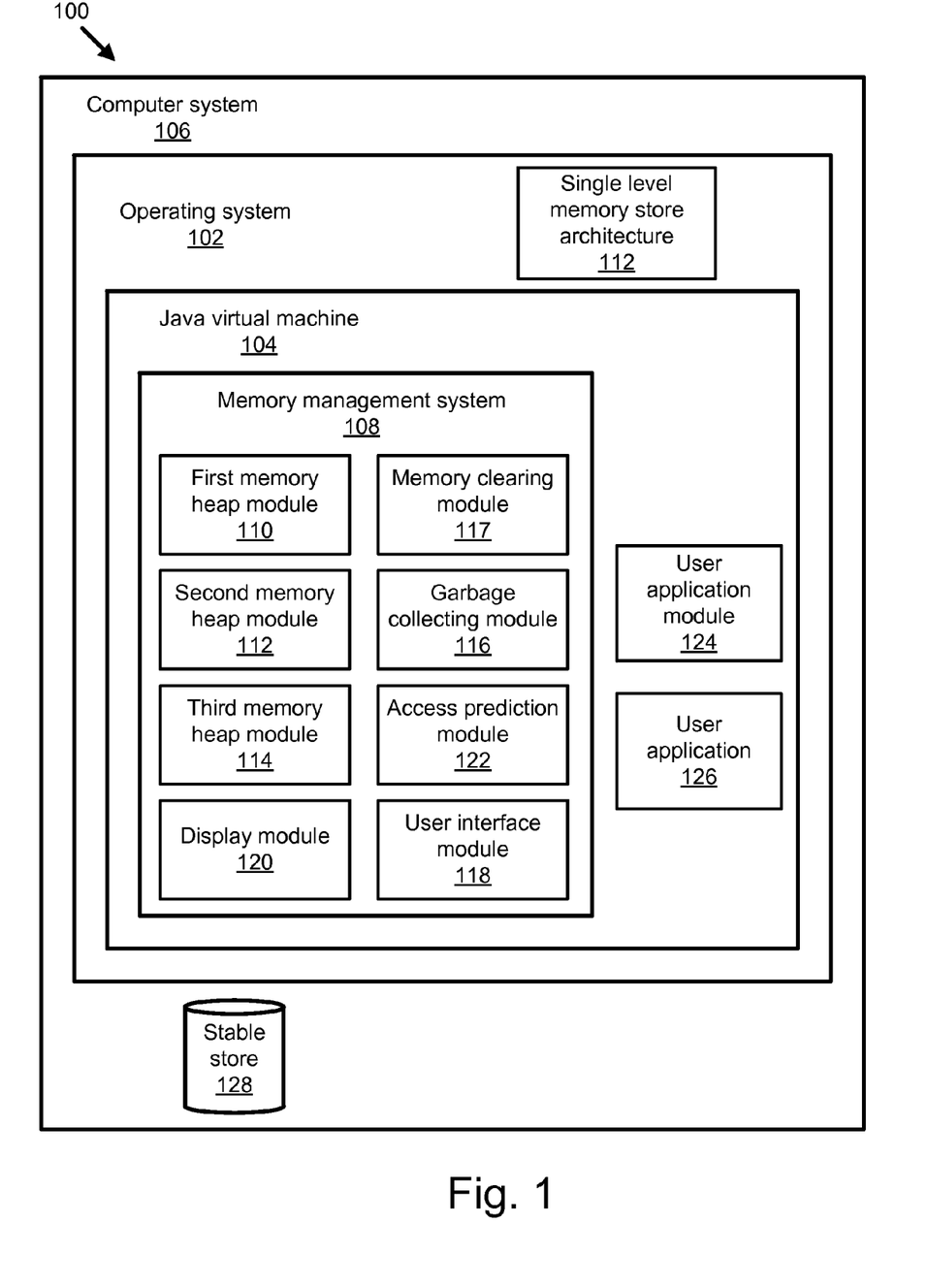
FIG. 1 is a schematic block diagram illustrating one embodiment of a system for managing memory objects in accordance with the present invention.

FIG. 1 is a schematic block diagram illustrating one embodiment of a system 100 for managing memory objects in accordance with the present invention. The system 100 includes an operating system (OS) 102 such as Windows®, Linux®, Mac OS®, IBM i5/OS®, and/or other OS comprising a Java virtual machine 104 running on a computer system 106. One of ordinary skill in the art may determine the types of computer systems 106 that may benefit from the implementation of the present invention based on the disclosures herein. In alternate embodiments, the OS 102 may comprise a programming environment 104 such as P-Code Machine, Common Language Infrastructure, Open Firmware, and/or other programming environment 104 that may utilize garbage collection as a memory management technique. The OS 102 may utilize a single level store memory architecture, for example the IBM i5/OS®, although the OS 102 may also use other virtual memory management schemes and still realize the benefits of the present invention.

The system further includes a memory management system 108 comprising modules configured to functionally execute the steps of managing memory objects. The memory management system 108 includes a first memory heap module 110, a second memory heap module 112, and a third memory heap module 114. The memory management system 108 further includes a garbage collecting module 116, and may include a memory clearing module 117, a user interface module 118, a display module 120, and/or an access prediction module 122. In one embodiment, the system 100 further includes a user application module 124 that operates a user application 126. The system 100 may further include a stable store 128, for example a disk storage unit or the like. Elements 108-128 of FIG. 1 are described below in more detail, particularly in relation to FIGS. 2 and 4 below.

Figure 2:
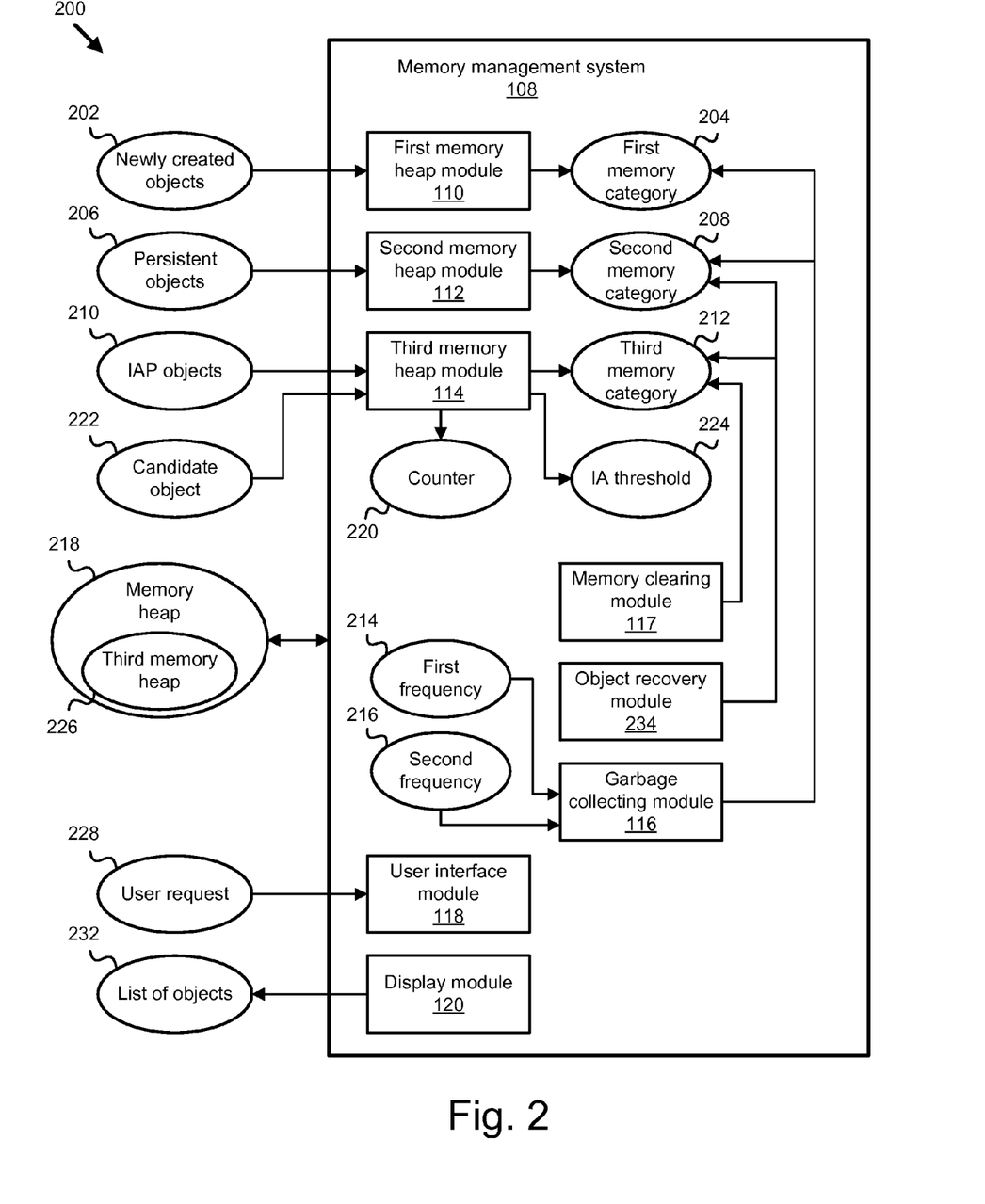
FIG. 2 is a schematic block diagram illustrating one embodiment of an apparatus for managing memory objects in accordance with the present invention.

FIG. 2 is a schematic block diagram illustrating one embodiment of an apparatus 200 for managing memory objects in accordance with the present invention. The apparatus 200 may be a memory management system 108. The apparatus 200 includes a first memory heap module 110 that assigns newly created objects 202 to a first memory category 204. The first memory category 204 may comprise a nursery area of a Java memory heap, an area of the heap where memory is allocated for newly created objects. The nursery area may be referred to as a "young generation" or other similar terminology. The apparatus 200 further includes a second memory heap module 112 that assigns persistent objects 206 to a second memory category 208. The second memory category 208 may comprise a tenured area of a Java memory heap, or an area of the heap where memory is allocated for persistent objects. The tenured area may be referred to as an "old generation" or similar terminology. Generally, object begin as newly created objects 202 and after some defined persistence time are promoted to persistent objects 206. The techniques for determining whether an object is newly created 202 versus existing long enough to be deemed persistent 206 are known in the art, and are mechanical steps for one of skill in the art.

The apparatus 200 further includes a third memory heap module 114 that assigns infrequently accessed persistent objects 210 from the second memory category 208 to a third memory category 212. The third memory category 212 is utilized to create a memory category 212 that can store infrequently accessed persistent objects 210 utilizing few expensive system resources such as RAM or computer system 106 processor cycles, while keeping the infrequently accessed persistent objects 210 accessible such that a fault does not occur in a future access event of the objects 210. For example, and without limitation, the third memory category 212 may mark some or all of the objects 210 for storage on a stable store 128, may prevent garbage collection of the objects 210, and the like.

The criteria utilized to determine when a persistent object 206 is infrequently accessed depend upon the goals of a particular embodiment of the apparatus 200, and are understood by one of skill in the art based upon the disclosures herein. "Infrequently accessed" as used herein encompasses at least two types of objects: objects that, based on past access behavior, have not been accessed for a predetermined time period, and objects that, based on some knowledge of potential future access, are not likely to be accessed for a period of time.

In one embodiment, the third memory heap module 114 increments a counter 220 each time a candidate object 222 is not accessed during an execution cycle, and assigns the candidate object 222 to the third memory category 212 from the second memory category 208 in response to the counter 220 exceeding an infrequently accessed threshold 224.

An execution cycle, depending on the embodiment, can be an execution cycle of the computer system 106, of the virtual machine 104, of a program running on the virtual machine 104 that references the candidate object 222, and/or of the memory management system 108. In one embodiment, an execution cycle is an execution cycle of a garbage collector. An execution cycle may be measured from the beginning of an execution cycle to the beginning of the next execution cycle, or other similar method. For example, a garbage collector may execute, and after the garbage collector completes operations (i.e. stops executing), a program on the virtual machine 104 may access a candidate object 222. In the example, the object 222 is accessed during the execution cycle of the garbage collector, even though the object 222 may not be accessed while the garbage collector is executing.

An access of the candidate object 222 refers to an access of the candidate object 222 other than a check by the garbage collecting module 116, for example by a user application. The counter 220 increment and the infrequently accessed threshold 224 can be set to any values, and it is within the skill of one in the art to determine appropriate values such that candidate objects 222 are assigned to the third memory category 212 after a desired period of infrequent access. For example, if the counter 220 increment is set to "1", and the infrequently accessed threshold 224 is set to "100", then the third memory heap module 114 assigns the candidate object 222 from the second memory category 208 to a third memory category 212 after 100 consecutive execution cycles wherein the candidate object 222 is not accessed.

In one embodiment, the third memory heap module 114 increments the counter 220 by a first increment value in response to the candidate object 222 having a size less than a threshold size, and increments the counter 220 by a second increment value in response to the candidate object 222 having a size greater than the threshold size. For example, the threshold size may be set to 1 megabyte (MB), the first increment value may be set to "1", and the second increment value may be set to "3." In the example, candidate objects 222 greater than 1 MB are assigned to the third memory category 212 three times as quickly as candidate objects 222 smaller than 1 MB. This embodiment allows a practitioner to configure the apparatus 200 to move larger or smaller objects more quickly out of volatile RAM and into a stable store 128 according to the priorities of a given embodiment of the apparatus 200. In alternate embodiments, the first increment value and second increment value may be utilized according to a priority value of the candidate object 222. For example, the apparatus 200 may be configured to keep objects with a high priority in the second memory category 208 longer, and to assign objects with a lower priority to the third memory category 212 more quickly.

In one embodiment, the third memory heap module 114 sets the infrequently accessed threshold 224 to a first threshold value in response to the candidate object 222 having a size less than a threshold size, and sets the infrequently accessed threshold 224 to a second threshold value in response to the candidate object 222 having a size greater than the threshold size. This embodiment allows a practitioner to configure the apparatus 200 to move larger or smaller objects more quickly out of RAM into a stable store 128 according to the priorities of a given application of the apparatus 200. In alternate embodiments, the first threshold value and second threshold value may be utilized according to a priority value of the candidate object 222. A priority value may be a calculated value—for example based on an access frequency of the candidate object 222, and/or a property of the candidate object 222 readable by the memory management system 108.

The apparatus 200 further includes a garbage collecting module 116 that checks the first memory category 204 at a first frequency 214, and that checks the second memory category 208 at a second frequency 216. Checking a memory category comprises checking whether at least one object assigned to the memory category still has a reference. For example, the garbage collecting module 116 may check the first memory category 204 at each execution cycle (the first frequency 214), and may check the second memory category 208 each fifth execution cycle (the second frequency 216). Checking the second memory category 208 each fifth execution cycle may comprise checking one-fifth of the second memory category 208 at each execution cycle of the garbage collecting module 116. If an object is found to be no longer referenced during a check, the object is considered garbage and the memory allocated to the object is recovered by the virtual machine 104. The use of two generations to optimize garbage collecting is known in the art, and the setting of checking frequencies 214, 216 is a mechanical step for one of skill in the art.

In one embodiment, the garbage collecting module 116 is further configured to not check the third memory category 212. In a further embodiment, a memory clearing module 117 may periodically check whether any objects assigned to the third memory category 212 are no longer referenced. In one embodiment, where the garbage collecting module 116 is configured to not check the third memory category 212, the OS 102 determines that memory allocated to an object assigned to the third memory category 212 is inactive because the garbage collecting module 116 is no longer accessing the object, and the OS 102 automatically pages the memory allocated to the object to a stable store 128. In one embodiment, the memory clearing module 117 periodically checks whether any objects assigned to the third memory category 212 are no longer referenced, and notifies the OS 102 that the check of objects assigned to the third memory category 212 is not an access for the purposes of recovering paged memory from the stable store 128.

In one embodiment, the memory clearing module 117 that notifies the OS 102 that an object assigned to the third memory category 212 should be paged to a stable store 128. When the memory allocated to the object is paged to a stable store 128, the total size of the memory heap 218 is allowed to expand, but the physical RAM of the system 100 does not need to be increased because the expanded portion of the memory heap 218 is on the stable store 128. Further, the garbage collecting module 116 does not have an increased operational overhead, because the objects assigned to the third memory category 212 are only garbage collected optionally or not at all.

In one embodiment, the apparatus 200 includes a third memory heap 226 comprising memory space allocated to objects assigned to the third memory category 212. A portion of the third memory heap 226 may be within the computer system 106 RAM, and a portion of the third memory heap 226 may be on a stable store 128. In one embodiment, the apparatus 200 further includes a user interface module 118 that interprets a user request 228, and a display module 120 that reports a list of objects 232. A user request 228 may be a user input through hardware, a value in software, and/or an indicated request based on calculated parameters in the computer system 106. A report 232 may be an output display, a value provided to a network (not shown), a value stored in the computer system 106, and/or a value used in the computer system 106.

The list of objects 232 comprises objects that are assigned to the third memory category 212, and/or a list of objects assigned to the third memory category 212 that have never been accessed after initial allocation. For example, the display module 120 may operate during a debugging mode, and assist a user in determining objects that were allocated, but not used, during the operation of a user application. In an alternate embodiment, the apparatus 200 further includes a user interface module 118 that interprets a user request 228, and a display module 120 that reports a size of the third memory heap 226.

In one embodiment, the apparatus 200 includes an object recovery module 234 configured to assign an object from the third memory category 212 to the second memory category 208 in response to an access event directed to the object. For example, after an object is assigned to the third memory category 212 because the object was infrequently accessed, the object is still available and may be accessed at a future time. In one embodiment, the object recovery module 234 assigns the object back to the second memory category 208 after a single access event. In alternate embodiments, the object recovery module 234 may wait for multiple access events before moving the object back to the second memory category 208 in response to an access event directed to the object.

Figure 3:
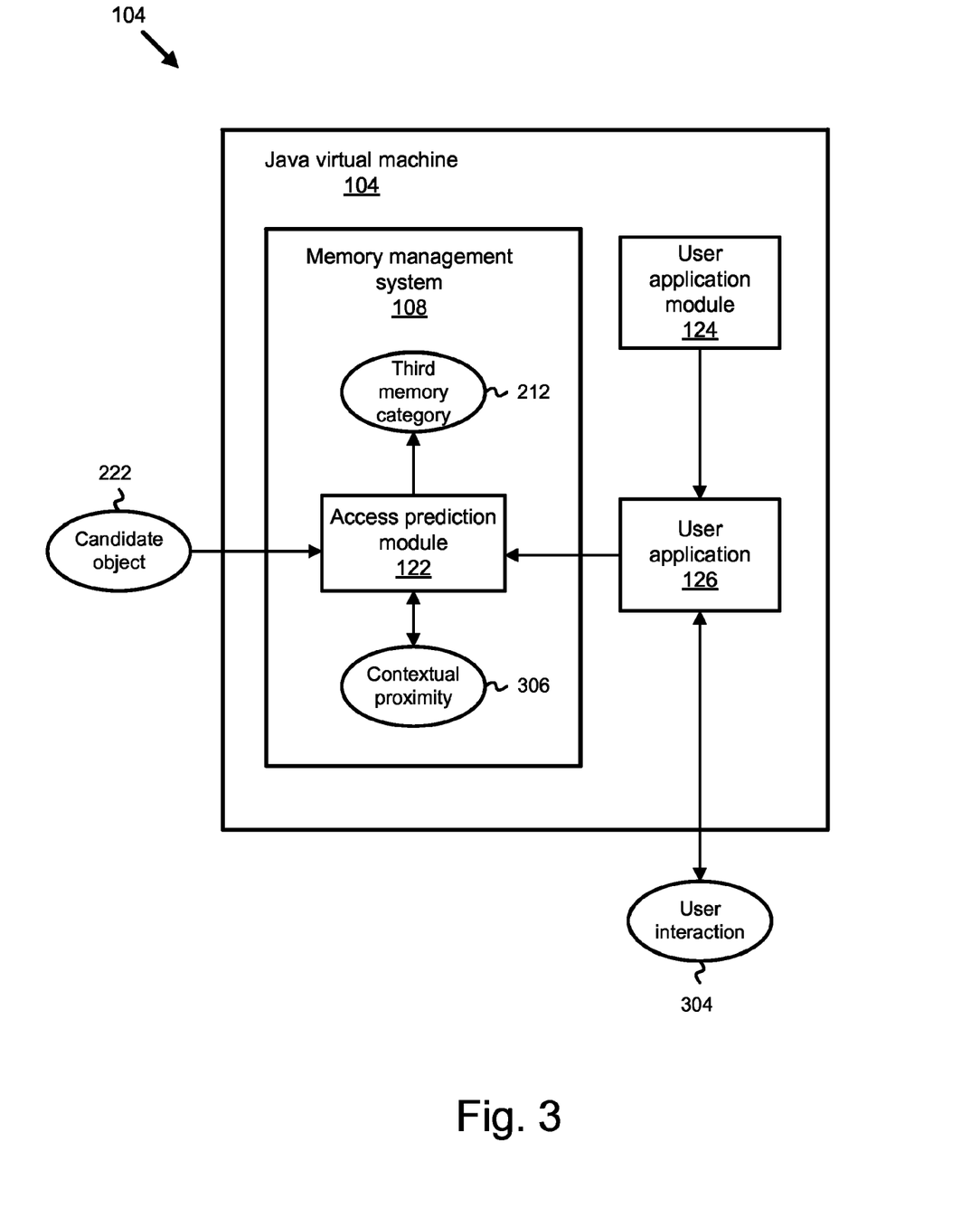
FIG. 3 is a schematic block diagram illustrating one embodiment of a Java virtual machine in accordance with the present invention.

FIG. 3 is a schematic block diagram illustrating one embodiment of a Java virtual machine 104 in accordance with the present invention. The Java virtual machine 104 includes a user application module 124 that operates a user application 126. The memory management system 108 includes an access prediction module 122 that interprets a user interaction 304 with the user application 126 and estimates a contextual proximity 306 for a candidate object 222 based on the user interaction 304. The access prediction module 122 further assigns the candidate object 222 to the third memory category 212 based on the contextual proximity 306 for the candidate object 222.

For example, a candidate object 222 may be a description of a room in a virtual environment, and the contextual proximity 306 may be an indication of how many rooms within the virtual environment that a user would have to traverse to enter the environment described by the candidate object 222. In the example, where a user is not near the candidate object 222, the access prediction module 122 may determine that the contextual proximity 306 is such that the candidate object 222 should be assigned directly to the third memory category 212. An access prediction module 122 may be utilized in many applications 126, for example in a retail product catalog, virtual map data, a server based network game, and any other environment where long lived but rarely accessed objects are utilized by the application 126.

Figure 4:
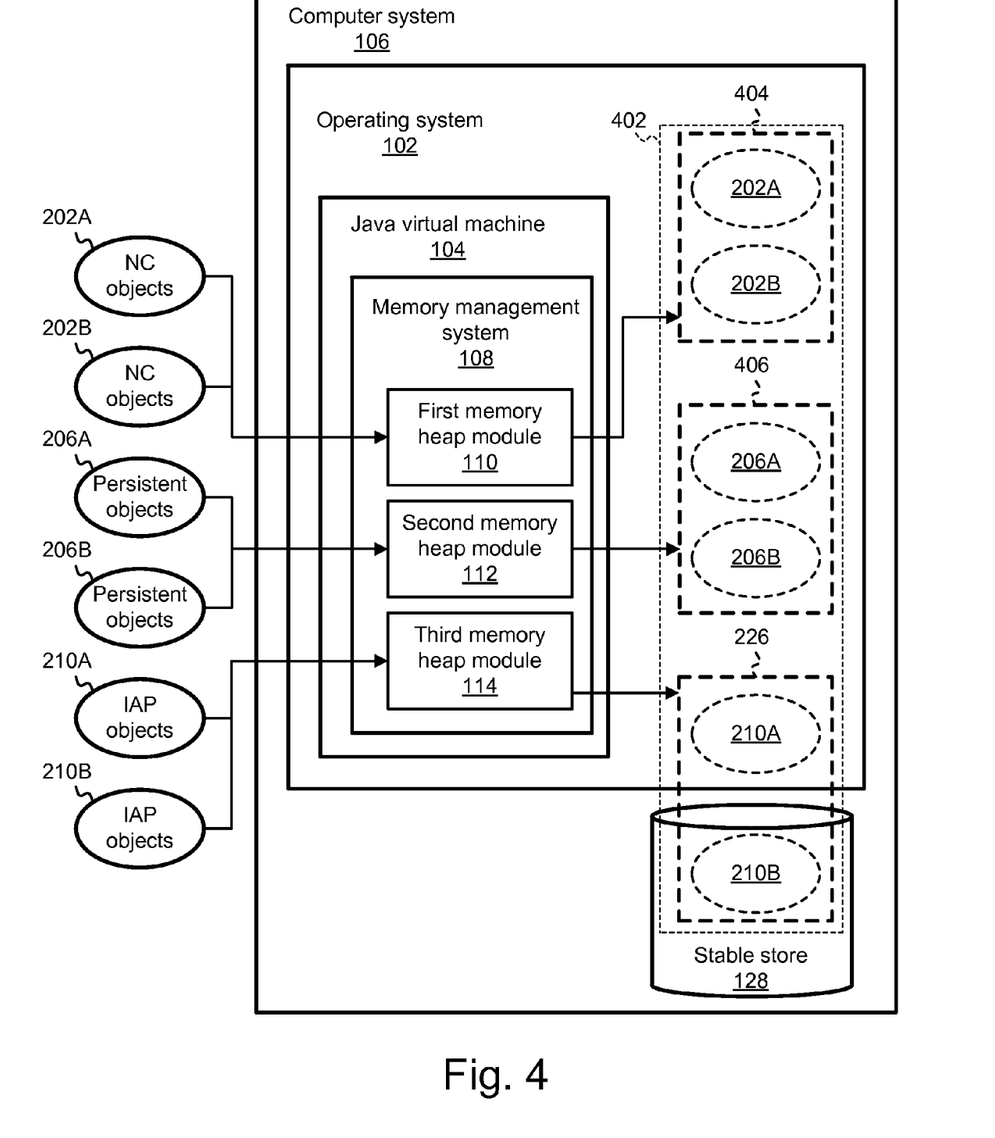
FIG. 4 is a schematic block diagram illustrating one embodiment of a Java memory heap in accordance with the present invention.

FIG. 4 is a schematic block diagram illustrating one embodiment of a Java memory heap 402 in accordance with the present invention. The Java memory heap 402 includes a first memory heap 404 comprising memory space allocated to objects assigned to the first memory category 204, a second memory heap 406 comprising memory space allocated to objects assigned to the second memory category 208, and a third memory heap 226 comprising memory space allocated to objects assigned to the third memory category 212. In one embodiment, the first memory heap 404 and the second memory heap 406 are stored within the computer system 106 RAM. The third memory heap 226 is stored within the computer system 106 RAM and/or a stable store 128. In one example, when the third memory heap module 114 assigns an object from the second memory category 208 to the third memory category 212, memory allocated for the object initially remains in computer system 106 RAM within the third memory heap 226. In the example, the OS 102 may move the allocated memory for the object to the stable store 128 within the third memory heap 226. The stable store 128 may comprise more than one potential location, although a single disk storage 128 is shown in FIG. 4 for illustration.

In the embodiment of FIG. 4, two newly created objects 202A, 202B are shown having memory allocated in the first memory heap 404, indicating that the first memory heap module 110 has assigned the objects 202A, 202B to the first memory category 204. Two persistent objects 206A, 206B are shown having memory allocated in the second memory heap 406, indicating that the second memory heap module 112 has assigned the objects 206A, 206B to the second memory category 208. Two infrequently accessed persistent objects 210A, 210B are shown having memory allocated in the third memory heap 226, indicating that the third memory heap module 114 has assigned the objects 210A, 210B to the third memory category 212. In the embodiment of FIG. 4, a first infrequently accessed persistent object 210A is shown still in the computer system 106 RAM, while a second infrequently accessed persistent object 210B is shown moved by the OS 102 to a stable store 128. During a subsequent execution of the apparatus 200, a persistent object 210A, 210B may be considered as a candidate object 222 by the third memory heap module 114, and the third memory heap module 114 may assign the candidate object 222 to the third memory category 212 in response to the candidate object 222 being infrequently accessed.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
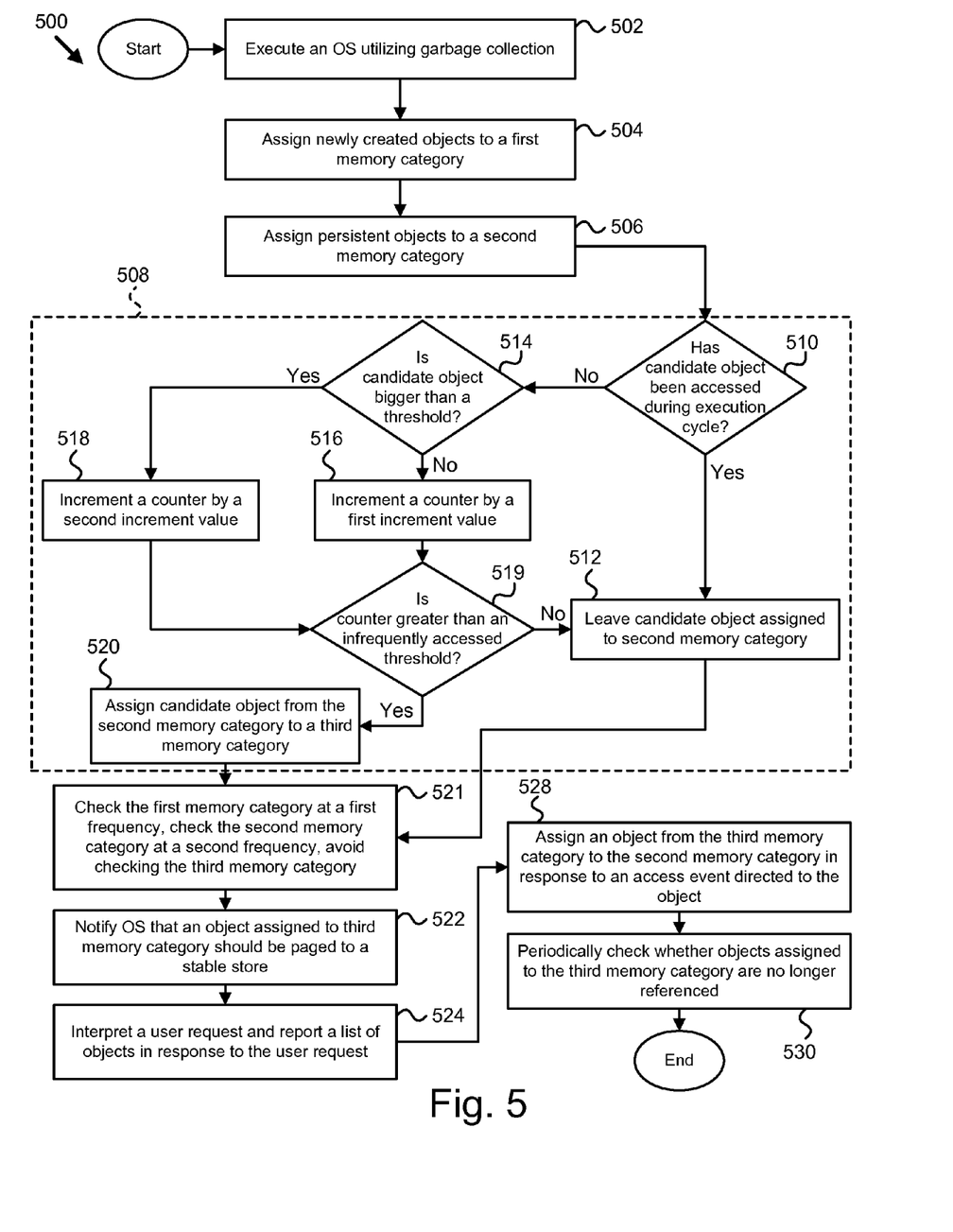
FIG. 5 is a schematic flow diagram illustrating one embodiment of a method for managing memory objects in accordance with the present invention.

FIG. 5 is a schematic flow diagram illustrating one embodiment of a method 500 for managing memory objects in accordance with the present invention. The method 500 may be implemented as a computer program product comprising a computer readable medium having a computer readable program, wherein the computer readable program when executed on a computer causes the computer to execute the method 500. The method 500 includes a computer system 106 executing 502 an OS 102 utilizing garbage collection memory management. The method 500 further includes a first memory heap module 110 assigning 504 newly created objects to a first memory category, a second memory heap module 112 assigning 506 persistent objects to a second memory category, and a third memory heap module 114 assigning 508 infrequently accessed persistent objects from the second memory category to a third memory category. The method 500 further includes a garbage collecting module 116 checking 521 the first memory category at a first frequency, and the second memory category at a second frequency, and to not check the third memory category.

In one embodiment, the third memory heap module 114 assigns 508 infrequently accessed persistent objects from the second memory category to a third memory category by: determining 510 whether a candidate object has been accessed during an execution cycle and leaving 512 the candidate object assigned to the second memory category if the object has been accessed during an execution cycle; determining 514 whether the candidate object is larger than a threshold size; incrementing 516 a counter by a first increment value if the candidate object is not greater than the threshold size; incrementing 518 the counter by a second increment value if the candidate object is greater than the threshold size; and determining 519 whether the counter exceeds an infrequently accessed threshold, and assigning 520 the candidate object from the second memory category to the third memory category if the determination 519 is positive.

In one embodiment, the method 500 further includes a memory clearing module 117 notifying 522 an OS 102 that an object assigned to the third memory category should be paged to a stable store. In one embodiment, the method 500 further includes a user interface module 118 interpreting 524 a user request, and a display module 120 reporting a list of objects in response to the user request. In one embodiment, the method 500 further includes an object recovery module 234 assigning 528 an object from the third memory category to the second memory category in response to an access event directed to the object. In one embodiment, the method 500 further includes the memory clearing module 117 periodically checking 530 whether any objects assigned to the third memory category are no longer referenced.

Figure 6:
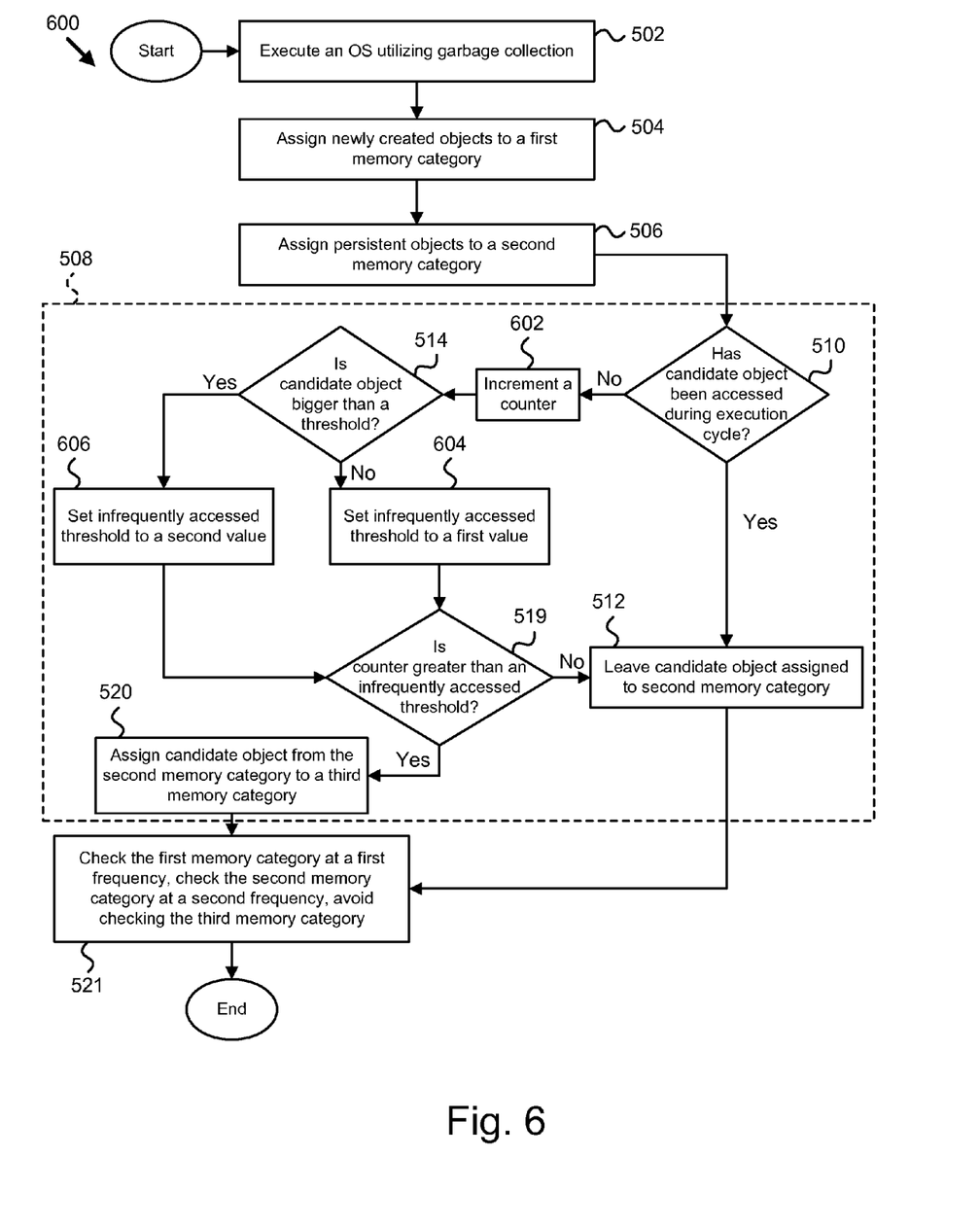
FIG. 6 is a schematic flow diagram illustrating an alternate embodiment of a method for managing memory objects in accordance with the present invention.

FIG. 6 is a schematic flow diagram illustrating an alternate embodiment of a method 600 for managing memory objects in accordance with the present invention. The method 600 may be implemented as a computer program product comprising a computer readable medium having a computer readable program, wherein the computer readable program when executed on a computer causes the computer to execute the method 600. The method 600 includes a computer system 106 executing 502 an OS 102 utilizing garbage collection memory management. The method 600 further includes a first memory heap module 110 assigning 504 newly created objects to a first memory category, a second memory heap module 112 assigning 506 persistent objects to a second memory category, and a third memory heap module 114 assigning 508 infrequently accessed persistent objects from the second memory category to a third memory category. The method 600 further includes a garbage collecting module 116 checking 521 the first memory category at a first frequency, and the second memory category at a second frequency, and to not check the third memory category.

In one embodiment, the third memory heap module 114 assigns 508 infrequently accessed persistent objects from the second memory category to a third memory category by: determining 510 whether a candidate object has been accessed during an execution cycle and leaving 512 the candidate object assigned to the second memory category if the object has been accessed during an execution cycle; incrementing 602 a counter; determining 514 whether the candidate object is larger than a threshold size; setting 604 an infrequently accessed threshold to a first threshold value if the candidate object is not greater than the threshold size; setting 606 the infrequently accessed threshold to a second threshold value if the candidate object is greater than the threshold size; determining 519 whether the counter exceeds an infrequently accessed threshold, and assigning 520 the candidate object from the second memory category to the third memory category if the determination 519 is positive.

Figure 7:
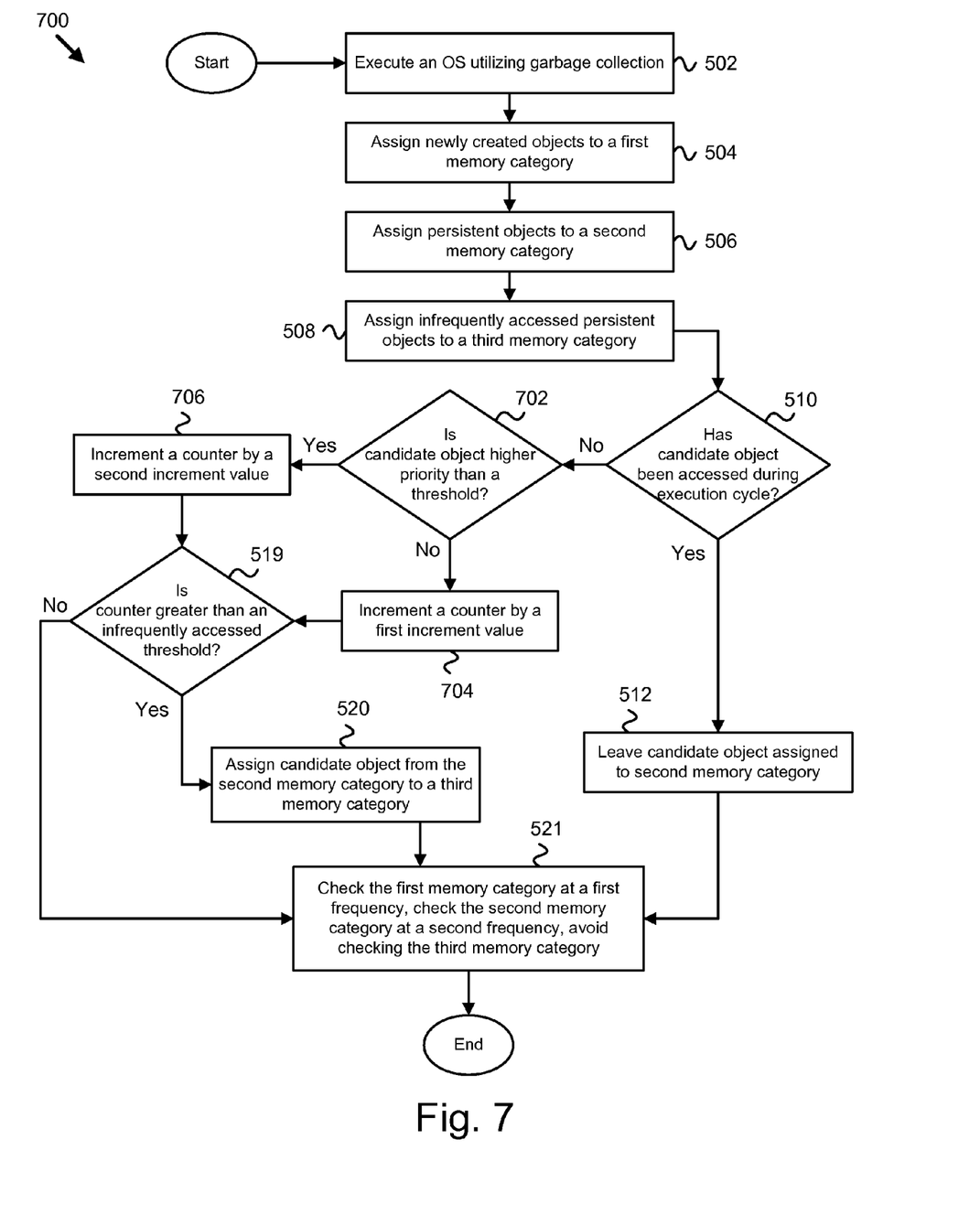
FIG. 7 is a schematic flow diagram illustrating an alternate embodiment of a method for managing memory objects in accordance with the present invention.

FIG. 7 is a schematic flow diagram illustrating an alternate embodiment of a method 700 for managing memory objects in accordance with the present invention. The method 700 may be implemented as a computer program product comprising a computer readable medium having a computer readable program, wherein the computer readable program when executed on a computer causes the computer to execute the method 700. The method 700 includes a computer system 106 executing 502 an OS 102 utilizing garbage collection memory management. The method 700 further includes a first memory heap module 110 assigning 504 newly created objects to a first memory category, a second memory heap module 112 assigning 506 persistent objects to a second memory category, and a third memory heap module 114 assigning 508 infrequently accessed persistent objects from the second memory category to a third memory category. The method 700 further includes a garbage collecting module 116 checking 521 the first memory category at a first frequency, and the second memory category at a second frequency, and to not check the third memory category.

In one embodiment, the third memory heap module 114 assigns 508 infrequently accessed persistent objects from the second memory category to a third memory category by: determining 510 whether a candidate object has been accessed during an execution cycle and leaving 512 the candidate object assigned to the second memory category if the object has been accessed during an execution cycle; determining 702 whether the candidate object has a priority greater than a threshold priority value; incrementing 704 a counter by a first increment value if the candidate object is not greater than the threshold priority value; incrementing 706 the counter by a second increment value if the candidate object is greater than the threshold priority value; and determining 519 whether the counter exceeds an infrequently accessed threshold, and assigning 520 the candidate object from the second memory category to the third memory category if the determination 519 is positive.

Figure 8:
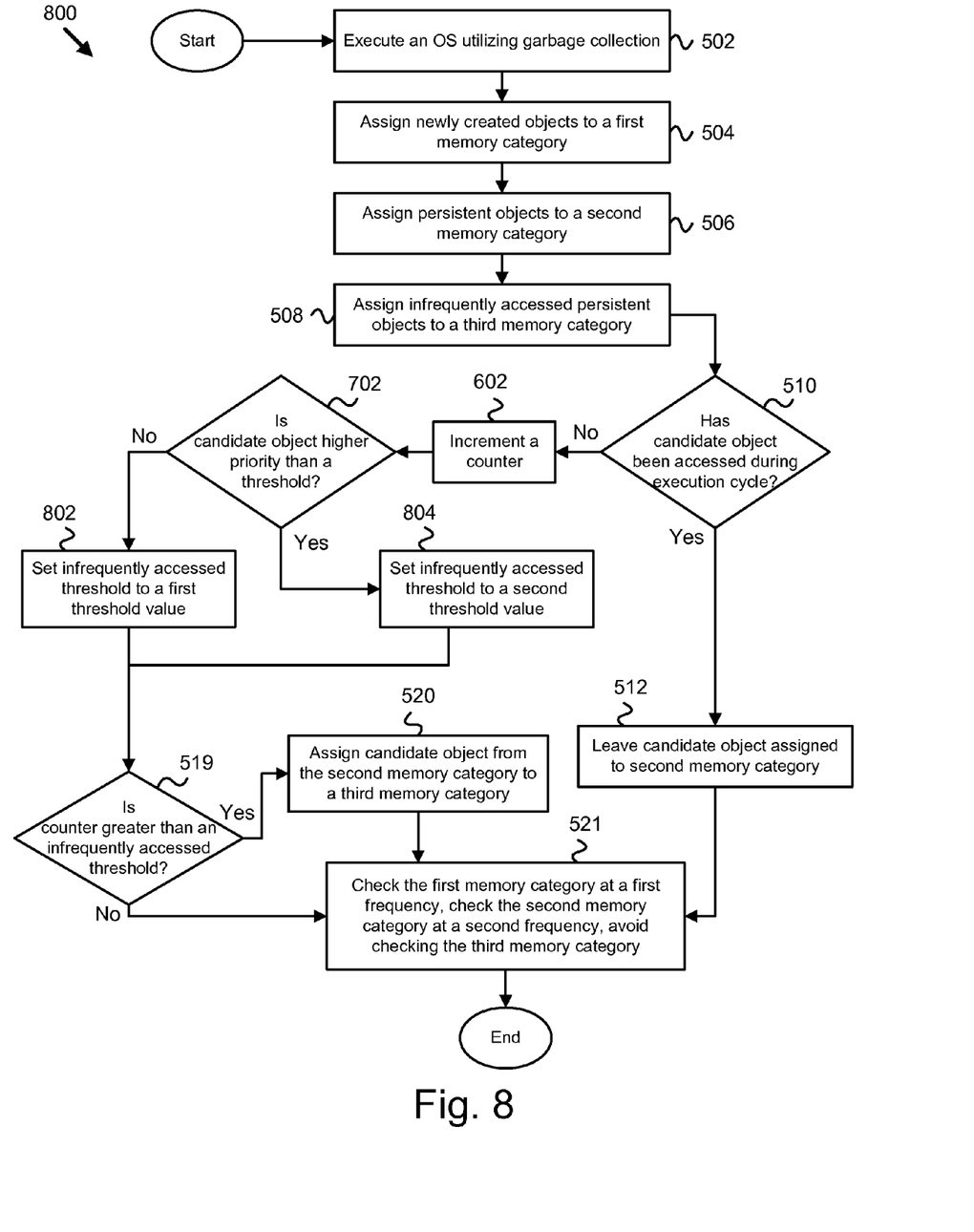
FIG. 8 is a schematic flow diagram illustrating an alternate embodiment of a method for managing memory objects in accordance with the present invention.

FIG. 8 is a schematic flow diagram illustrating an alternate embodiment of a method 800 for managing memory objects in accordance with the present invention. The method 800 may be implemented as a computer program product comprising a computer readable medium having a computer readable program, wherein the computer readable program when executed on a computer causes the computer to execute the method 800. The method 800 includes a computer system 106 executing 502 an OS 102 utilizing garbage collection memory management. The method 800 further includes a first memory heap module 110 assigning 504 newly created objects to a first memory category, a second memory heap module 112 assigning 506 persistent objects to a second memory category, and a third memory heap module 114 assigning 508 infrequently accessed persistent objects from the second memory category to a third memory category. The method 800 further includes a garbage collecting module 116 checking 521 the first memory category at a first frequency, and the second memory category at a second frequency, and to not check the third memory category.

In one embodiment, the third memory heap module 114 assigns 508 infrequently accessed persistent objects from the second memory category to a third memory category by: determining 510 whether a candidate object has been accessed during an execution cycle and leaving 512 the candidate object assigned to the second memory category if the object has been accessed during an execution cycle; incrementing 602 a counter; determining 702 whether the candidate object has a priority greater than a threshold priority value; setting 802 an infrequently accessed threshold to a first threshold value if the candidate object is not greater than the threshold priority value; setting 804 the infrequently accessed threshold to a second threshold value if the candidate object is greater than the threshold priority value; and determining 519 whether the counter exceeds an infrequently accessed threshold, and assigning 520 the candidate object from the second memory category to the third memory category if the determination 519 is positive.

Figure 9:
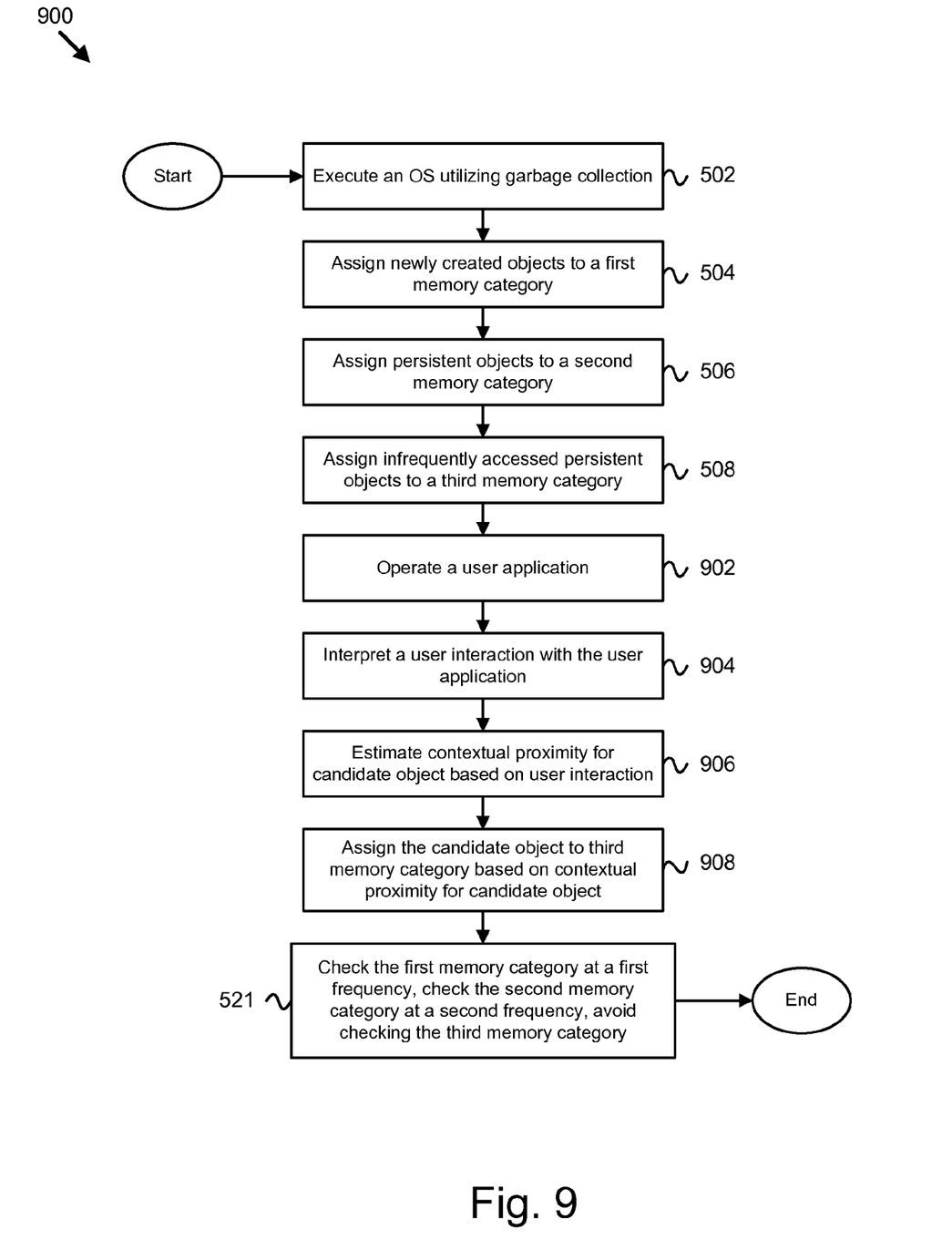
FIG. 9 is a schematic flow diagram illustrating an alternate embodiment of a method for managing memory objects in accordance with the present invention.

FIG. 9 is a schematic flow diagram illustrating an alternate embodiment of a method 900 for managing memory objects in accordance with the present invention. The method 900 may be implemented as a computer program product comprising a computer readable medium having a computer readable program, wherein the computer readable program when executed on a computer causes the computer to execute the method 900. The method 900 includes a computer system 106 executing 502 an OS 102 utilizing garbage collection memory management. The method 900 further includes a first memory heap module 110 assigning 504 newly created objects to a first memory category, a second memory heap module 112 assigning 506 persistent objects to a second memory category, and a third memory heap module 114 assigning 508 infrequently accessed persistent objects from the second memory category to a third memory category. The method 900 further includes a garbage collecting module 116 checking 521 the first memory category at a first frequency, and the second memory category at a second frequency, and to not check the third memory category.

The method 900 further includes a user application module 124 operating 902 a user application 126, and an access prediction module 122 interpreting 904 a user interaction 304 with the user application 126. The method 900 further includes the access prediction module 122 estimating 906 a contextual proximity 306 for a candidate object 222 based on the user interaction 304, and assigning 908 the candidate object 222 to the third memory category 212 based on the contextual proximity 306 for the candidate object 222.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for managing memory objects, the apparatus comprising:
a non-transitory computer readable storage medium storing a computer readable program;
a processor executing the computer readable program, the computer readable program comprising:
a first memory heap module configured to assign a newly created object to a first memory category;
a second memory heap module configured to assign a persistent object to a second memory category; and
an access prediction module configured to assign a candidate object from the second memory category to a third memory category based on an estimated contextual proximity of the candidate object determined from a user interaction with an application.

2. The apparatus of claim 1, the computer readable program further comprising a garbage collecting module configured to recover memory allocated to a first memory category object in response to the first memory category object no longer being referenced, and recover memory allocated to a second memory category object in response to the second memory category object no longer being referenced, the garbage collection module not recovering objects of the third memory category.

3. The apparatus of claim 1, the computer readable program further comprising a memory clearing module configured to instruct an operating system to page an object assigned to the third memory category to a stable store.

4. The apparatus of claim 1, wherein the apparatus operates on an operating system comprising a Java virtual machine.

5. The apparatus of claim 1, wherein the apparatus operates on an operating system utilizing a single level store memory architecture.

6. The apparatus of claim 1, further comprising a third memory heap module configured to increment a counter each time the candidate object is not accessed during an execution cycle and to assign the candidate object to the third memory category from the second memory category in response to the counter exceeding an infrequently accessed threshold.

7. The apparatus of claim 6 wherein the third memory heap module is further configured to increment the counter by a first increment value in response to the candidate object having a size not greater than a threshold size, and to increment the counter by a second increment value in response to the candidate object having a size greater than the threshold size.

8. The apparatus of claim 6, wherein the third memory heap module is further configured to set the infrequently accessed threshold to a first threshold value in response to the candidate object having a size not greater than a threshold size, and to set the infrequently accessed threshold to a second threshold value in response to the candidate object having a size greater than the threshold size.

9. The apparatus of claim 1, the computer readable program further comprising a user interface module configured to interpret a user request and a display module configured to report at least one feature of a third memory heap selected from the group of features consisting of a size of the third memory heap, and a list of objects assigned to the third memory category.

10. The apparatus of claim 1, the computer readable program further comprising a user interface module configured to interpret a user request and a display module configured to report a list of objects, wherein the list of objects comprises objects that are assigned to the third memory category and that have received no access requests after initial allocation.

11. The apparatus of claim 1, the computer readable program further comprising an object recovery module configured to assign an object from the third memory category to the second memory category in response to an access event directed to the object.

12. A computer program product for managing memory objects comprising a non-transitory computer readable storage medium storing a computer readable program, wherein the computer readable program when executed on a computer causes:
assigning newly created objects to a first memory category;
assigning persistent objects to a second memory category; and
assigning a candidate object from the second memory category to a third memory category based on an estimated contextual proximity of the candidate object determined from a user interaction with an application.

13. The computer program product of claim 12, wherein the computer readable program further causes incrementing a counter each time the candidate object is not accessed during an execution cycle and assigning the candidate object from the second memory category to the third memory category in response to the counter exceeding an infrequently accessed threshold.

14. The computer program product of claim 13, wherein incrementing the counter comprises incrementing the counter by a first increment value in response to the candidate object having a size not greater than a threshold size, and incrementing the counter by a second increment value in response to the candidate object having a size greater than the threshold size.

15. The computer program product of claim 13, wherein the computer readable program further causes setting the infrequently accessed threshold to a first threshold value in response to the candidate object having a size not greater than a threshold size and setting the infrequently accessed threshold to a second threshold value in response to the candidate object having a size greater than the threshold size.

16. The computer program product of claim 13, wherein incrementing the counter comprises incrementing the counter by a first increment value in response to the candidate object having a priority value not greater than a threshold priority value and incrementing the counter by a second increment value in response to the candidate object having a priority value greater than the threshold priority value.

17. The computer program product of claim 13, wherein the computer readable program further causes setting the infrequently accessed threshold to a first threshold value in response to the candidate object having a priority value not greater than a threshold priority value and setting the infrequently accessed threshold to a second threshold value in response to the candidate object having a priority value greater than the threshold priority value.

18. The computer program product of claim 12, further comprising an operating system (OS) comprising a Java virtual machine, wherein the first memory category is associated with a nursery area of a Java memory heap, and wherein the second memory category is associated with a tenured area of the Java memory heap.

19. The computer program product of claim 12, wherein the computer readable program further causes instructing an OS that an object assigned to the third memory category be paged to a stable store.

20. The computer program product of claim 12, wherein the computer readable program utilizing an OS comprising a single level store memory architecture.

21. The computer program product of claim 12, wherein the computer readable program further causes interpreting a user request and reporting a list of objects assigned to the third memory category in response to the user request.

22. The computer program product of claim 12, wherein the computer readable program further causes interpreting a user request and reporting a list of objects in response to the user request, wherein the list of objects comprise objects that are assigned to the third memory category and that have never been accessed after initial allocation.

23. The computer program product of claim 12, wherein the computer readable program further causes assigning an object from the third memory category to the second memory category in response to an access event directed to the object.

24. The computer program product of claim 12, wherein the computer readable program further causes periodically recovering an object assigned to the third memory category in response to the object no longer being referenced.

25. The computer program product of claim 12, the computer readable program further causing operating a garbage collector recovering memory allocated to a first memory category object in response to the first memory category object no longer being referenced and recovering memory allocated to a second memory category object in response to the second memory category object no longer being referenced, the garbage collector not recovering objects of the third memory category.

26. A system for managing memory objects, the system comprising:
  a non-transitory computer readable storage medium storing a computer readable program;
  a processor executing the computer readable program, the computer readable program comprising:
    a memory management system comprising:
      a first memory heap module configured to assign a newly created object to a first memory category;
      a second memory heap module configured to assign a persistent object to a second memory category; and
      an access prediction module configured to assign a candidate object from the second memory category to a third memory category based on an estimated contextual proximity of the candidate object determined from a user interaction with an application.

27. The system of claim 26, wherein the memory management system further includes a memory clearing module configured to instruct an operating system (OS) that an object assigned to the third memory category be paged to a stable store.

28. The system of claim 26, further comprising an OS utilizing a single level store memory architecture.

29. The system of claim 26, wherein the memory management system further comprises:
  a user interface module configured to interpret a user request; and
  a display module configured to report at least one feature of a third memory heap selected from the group of features consisting of a size of the third memory heap and a list of objects assigned to the third memory category.

30. The system of claim 26, the memory management system further comprising a garbage collecting module recovering memory allocated to a first memory category object in response to the first memory category object no longer being referenced and recovering memory allocated to a second memory category object in response to the second memory category object no longer being referenced, the garbage collecting module not recovering objects of the third memory category.

* * * * *